(12) United States Patent
Wang et al.

(10) Patent No.: US 8,477,913 B2
(45) Date of Patent: Jul. 2, 2013

(54) VOICEMAIL WITH DATA CONTENT

(75) Inventors: Winston Wang, Seattle, WA (US);
Adam Holt, London (GB)

(73) Assignee: T-Mobile USA, Inc., Bellevue, WA (US)

(*) Notice: Subject to any disclaimer, the term of this patent is extended or adjusted under 35 U.S.C. 154(b) by 651 days.

(21) Appl. No.: 12/434,603

(22) Filed: May 1, 2009

(65) Prior Publication Data
US 2010/0278319 A1    Nov. 4, 2010

(51) Int. Cl.
*H04M 1/64* (2006.01)

(52) U.S. Cl.
USPC ..................... 379/88.11; 379/88.13

(58) Field of Classification Search
USPC ................. 379/67.1, 68, 88.11, 88.13, 88.22, 379/88.23, 88.27, 88.25
See application file for complete search history.

(56) References Cited

U.S. PATENT DOCUMENTS

| | | | | |
|---|---|---|---|---|
| 5,568,540 | A * | 10/1996 | Greco et al. | 379/88.25 |
| 5,781,901 | A * | 7/1998 | Kuzma | 1/1 |
| 6,393,107 | B1 * | 5/2002 | Ball et al. | 379/88.13 |
| 6,411,684 | B1 * | 6/2002 | Cohn et al. | 379/88.14 |
| 6,839,411 | B1 * | 1/2005 | Saltanov et al. | 379/88.13 |
| 6,859,213 | B1 * | 2/2005 | Carter | 715/752 |
| 7,096,432 | B2 * | 8/2006 | Huapaya et al. | 715/863 |
| 7,149,777 | B1 * | 12/2006 | Rhee | 709/206 |
| 7,203,286 | B1 * | 4/2007 | Brockenbrough et al. | 379/76 |
| 7,212,614 | B1 * | 5/2007 | Burg et al | 379/88.18 |
| 7,263,370 | B1 | 8/2007 | Infosino | |
| 7,409,424 | B2 * | 8/2008 | Parker | 709/206 |
| 7,447,507 | B1 | 11/2008 | Infosino | |
| 7,466,803 | B2 | 12/2008 | Burg et al. | |
| 7,512,219 | B2 * | 3/2009 | Kovales et al. | 379/88.23 |
| 7,664,235 | B2 * | 2/2010 | Hirschberg et al. | 379/68 |
| 7,756,258 | B2 | 7/2010 | Clift et al. | |
| 7,899,161 | B2 * | 3/2011 | Katkam et al. | 379/88.13 |
| 2002/0152402 | A1 * | 10/2002 | Tov et al. | 713/201 |
| 2004/0105536 | A1 * | 6/2004 | Williams | 379/211.02 |
| 2004/0203678 | A1 | 10/2004 | MacNamara et al. | |
| 2004/0248594 | A1 | 12/2004 | Wren, III | |
| 2005/0048967 | A1 | 3/2005 | Hoglander et al. | |
| 2006/0265458 | A1 | 11/2006 | Aldrich et al. | |
| 2007/0036292 | A1 | 2/2007 | Selbie et al. | |

(Continued)

FOREIGN PATENT DOCUMENTS

| KR | 20050021227 A | 3/2005 |
|---|---|---|
| KR | 20050082484 A | 8/2005 |

OTHER PUBLICATIONS

International Search Report for PCT/US2010/032392, dated Nov. 10, 2010, from the Korean Intellectual Property Office, 5 pages.

(Continued)

*Primary Examiner* — Olisa Anwah
(74) *Attorney, Agent, or Firm* — Lee & Hayes, PLLC

(57) ABSTRACT

Techniques for attaching content to a voicemail are described. Content may be attached to a voicemail by storing the content and the voicemail in a common container or envelope, embedding the content at a location within the voicemail, tagging the content with an identifier identifying the voicemail, tagging the voicemail with a tag identifying the content and a location of the content on a network, or otherwise associating the content with the voicemail. A representation of the content to be attached to the voicemail may be visually displayed on a user interface of an originating telecommunications device before attaching the content to the voicemail.

15 Claims, 12 Drawing Sheets

U.S. PATENT DOCUMENTS

| | | |
|---|---|---|
| 2007/0112925 A1 | 5/2007 | Malik |
| 2007/0143495 A1 | 6/2007 | Porat |
| 2007/0155415 A1 | 7/2007 | Sheehy et al. |
| 2007/0274469 A1 | 11/2007 | Lesko et al. |
| 2008/0049911 A1 | 2/2008 | Hanson et al. |
| 2008/0232557 A1* | 9/2008 | Baird .................. 379/88.13 |
| 2009/0003540 A1* | 1/2009 | Zafar .................. 379/88.11 |
| 2009/0061827 A1 | 3/2009 | Bulgin et al. |
| 2009/0175425 A1 | 7/2009 | Lee |
| 2009/0197574 A1 | 8/2009 | Petronelli et al. |

OTHER PUBLICATIONS

Non-Final Office Action for U.S. Appl. No. 12/434,597, mailed on Nov. 9, 2011, Winston Wang, "Direct Voicemailing", 9 pages.

Non-Final Office Action for U.S. Appl. No. 12/434,597, mailed on May 22, 2012, Winston Wang et al., "Direct Voicemailing", 10 pages.

* cited by examiner

VOICEMAIL WITH DATA CONTENT

BACKGROUND

Over the past thirty years, telephony has significantly evolved from the once-ubiquitous public switched telephone service (PSTN). Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now exist in a myriad of form factors, such as traditional landline phones, cordless phones, cellular phones, smart phones, PDA phones, desktop and portable computers, media players, home telecommunications hubs, or the like (hereinafter "telecommunication devices"), which have become a ubiquitous part of modern life. Originally, most of these telecommunication devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications. Email, text messages (e.g., Short Message Service or SMS), and multimedia messages (e.g., Multimedia Messaging Service or MMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. Higher-end telecommunication devices are identified to include smart phones but increasingly include desktop and portable computers. These include telecommunication devices that typically have an operating system executed from some form of memory by one or more processors.

Voicemail is another voice communications mode, in which a caller leaves a recorded message for a recipient. The recipient listens and responds to a voicemail message at his or her leisure. Because of the time lag between leaving the message and actually listening or responding to the message, this communications mode is referred to as asynchronous.

Using conventional audible voicemail systems, a caller may not be able to articulate the message in an audible, clear manner, for the recipient to accurately hear and understand the voicemail message. Also, the recipient may be in a location with background noise, making it difficult to hear and understand the voicemail message. Also, if the recipient is driving when he or she receives the voicemail message, he or she may not be able to write down information from the voicemail message. Thus, the recipient may have to replay the voicemail message repeatedly, possibly without ever fully understanding the message.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
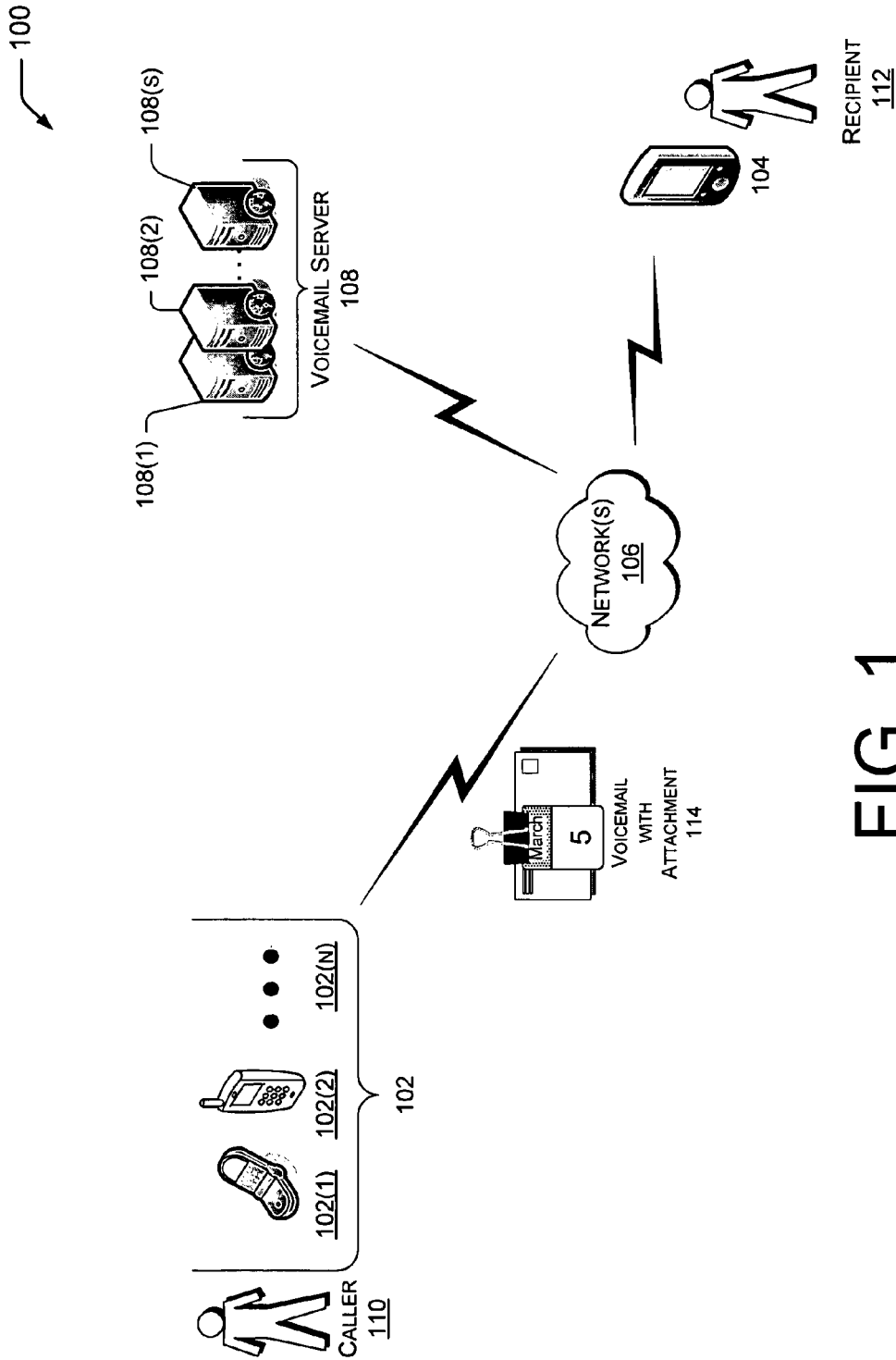
FIG. 1 is a block diagram of an exemplary architecture for sending, receiving, routing, and otherwise managing voicemail with attachments.

As discussed above, conventional voicemail systems may not always provide an effective way for a caller to convey information to a recipient. For example, in some instances, it may be easier and more effective for a caller to simply attach a document, map, contact information, calendar event, or other content to a voicemail, rather than providing such information audibly. This disclosure describes various exemplary ways of attaching content to a voicemail that allow callers or recipients to convey information in ways conventional audible-only voicemail systems do not.

In one implementation, when a caller reaches a voice mailbox of a called party, the caller may leave a voicemail message and may select to attach one or more items of content to the voicemail message. Examples of content that may be attached to a voicemail include, without limitation a calendar event, a map, directions, a contact name, a phone number, an address, an email address, a business card, a hyperlink, an audio file, a video file, a data file, an executable file, a video game, an image file, or any other data capable of transmission over a network.

The telecommunications device of the caller (the originating device) may visually present a representation of the selected content on the user interface before attaching the content to the voicemail. This visual representation allows the caller to visually verify that the correct content will be attached to the voicemail.

Various techniques are described for attaching the content to the voicemail. By way of example and not limitation, content may be attached to a voicemail by storing the content and the voicemail in a common container or envelope, embedding the content at a location within the voicemail, tagging the content with an identifier identifying the voicemail, tagging the voicemail with a tag identifying the content and a location of the content on a network, or otherwise associating the content with the voicemail.

The voicemail may be transmitted to a voicemail server for subsequent retrieval by a telecommunications device of the called party (the recipient device). The voicemail may be transmitted together with the attachment, or may be transmitted separately from the attachment and associated with the attachment at the recipient device, the voicemail server, or another network device. In some implementations, some or all of the content of an attachment may not be transmitted at all, such as in a case where attached content resides on a network server or storage device accessible to the recipient device.

In another implementation, a user may attach one or more items of content to an outgoing voicemail greeting that will be presented to callers when the user is unavailable or otherwise does not answer an incoming call. Content may be attached to outgoing voicemail greetings in the same or different manner as to other voicemail messages. In that case, when the caller is directed to the voicemail greeting, the caller may also be presented with content attached to the voicemail greeting such as, for example, an audible message, a textual message, a textual transcript of the voicemail greeting, contact information to reach the user, or any other type of content mentioned herein.

Illustrative Architecture

FIG. 1 is a block diagram of an exemplary architecture 100 in which content may be attached to voicemails between telecommunications devices. The architecture 100 includes exemplary originating devices 102(1), 102(2), . . . , 102(N), which may take a variety of forms, including, but not limited to, a cellular telephone 102(1), a smart phone 102(2), traditional landline telephones, cordless telephones, PDA telephones, desktop and portable computers, media players, home telecommunications hubs, or any other device 102(N) capable of engaging in telecommunications. The originating devices 102 are capable of connecting to one or more recipient devices 104 via one or more networks 106.

The network(s) 106 represents any type of telecommunications network(s), including cellular telecommunications network(s), IP-based telecommunications network(s) (e.g., Voice over Internet Protocol networks), traditional landline or PSTN network(s), or combinations of the foregoing (e.g., Unlicensed Mobile Access or UMA networks, the circuit-switched telephone networks or IP-based packet-switch networks). The network(s) 106 may also include wire-based networks (e.g., cable) and wireless networks (e.g., cellular, satellite, etc.).

The architecture 100 also includes a representative set of voicemail servers 108(1), 108(2), . . . , 108(S) that is accessible via the network(s) 106. The voicemail servers 108 may be independent servers, or a collection of servers that are configured to perform larger scale functions (e.g., a server farm) accessible by the network 106. In the illustrated example, the servers 108 represent multiple voicemail servers that receive, store, route, or otherwise manage voicemails (including voicemails with attachments) to serve between telecommunications devices. Thus, the voicemail servers 108 may be administered or hosted by a telecommunications service provider that provides telecommunications services including voicemail with attachments.

In the illustrated example, a caller 110 using the originating device 102 attempts to communicate with a recipient 112 using the recipient device 104. The term "caller" is used herein to indicate an originator of a communication, regardless of whether the communication consists of a voice call, voicemail, or a non-voice communication (e.g., an instant message). Unless otherwise noted, the term "call" is used herein to indicate communications including telephone calls, voicemails, and non-voice communications, such as text messages, instant messages, and the like. In this example, the recipient 112 is busy and unable to take the call. Accordingly, the caller 110 is sent to a voice mailbox of the recipient 112. In a conventional voicemail system, the caller would be limited to leaving the recipient an audible voicemail message. However, using the techniques described herein, the caller 110 is able to not only leave the recipient a voicemail message, but also to attach content as an attachment to the voicemail. That is, the caller 110 is able to leave a "voicemail with attachments" 114 for the recipient device 104 via the network(s) 106.

In another example, using the techniques described herein, recipient 112 may attach content to an outgoing voicemail greeting that will be presented to caller 110 when the recipient 112 is unavailable or opts not to answer an incoming communication. In that case, when directed to the voicemail greeting, the originating device 102 may also receive content attached to the voicemail greeting. For example, the voicemail greeting may include an attached electronic business card or contact information of a person to contact, in the recipient's absence or in case of emergencies. Other examples of content that may be attached to a voicemail greeting include any of the other types of content described herein.

Exemplary Telecommunications Device

Figure 2:
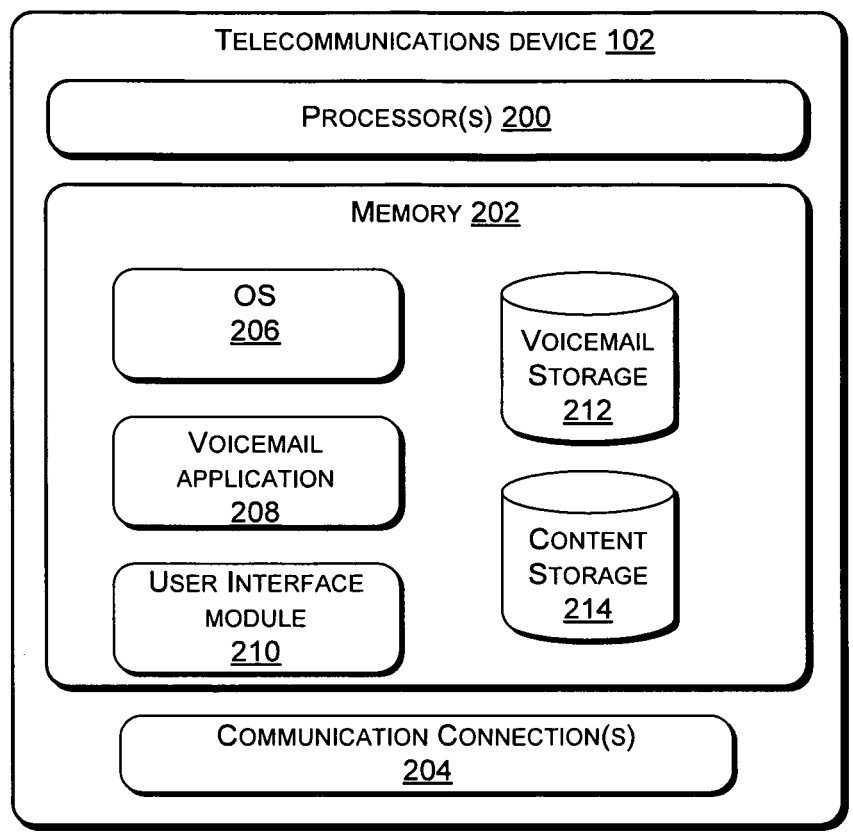
FIG. 2 is block diagram showing an exemplary telecommunications device usable to generate, send, store, and/or open voicemail with attachments in the architecture of FIG. 1.

FIG. 2 is a block diagram showing an exemplary telecommunications device, such as telecommunications device 102 or 104. As shown, the telecommunications device includes a processor 200, memory 202, and one or more communication connections 204.

The memory 202 includes an operating system 206, a voicemail application 208, and a user interface (UI) module 210 that, when executed on the processor 200, collectively facilitate presentation of a user interface on a display of the telecommunications device. Details of several illustrative user interfaces that may be presented are described below.

The memory 202 also includes voicemail storage 212 for locally storing one or more incoming and/or outgoing voicemail messages, and content storage 214 for storing one or more items of content. The memory 202 may also include one or more other applications or modules (not shown) for implementing various other functionality, such as an appointment calendar application, a navigation module, an email application, a word processing application, a media player application, and the like.

The communication connection(s) 204 may include a wide area network (WAN) module, a local area network module (e.g., WiFi), a personal area network module (e.g., Bluetooth), and/or any other suitable communication modules to allow telecommunications device to communicate over the network(s) 106.

Additionally or alternatively, a voicemail application and UI may be hosted by a network server, such as voicemail server 108, and served to the telecommunication devices 102 and 104 upon request.

Exemplary Server Implementation

Figure 3:
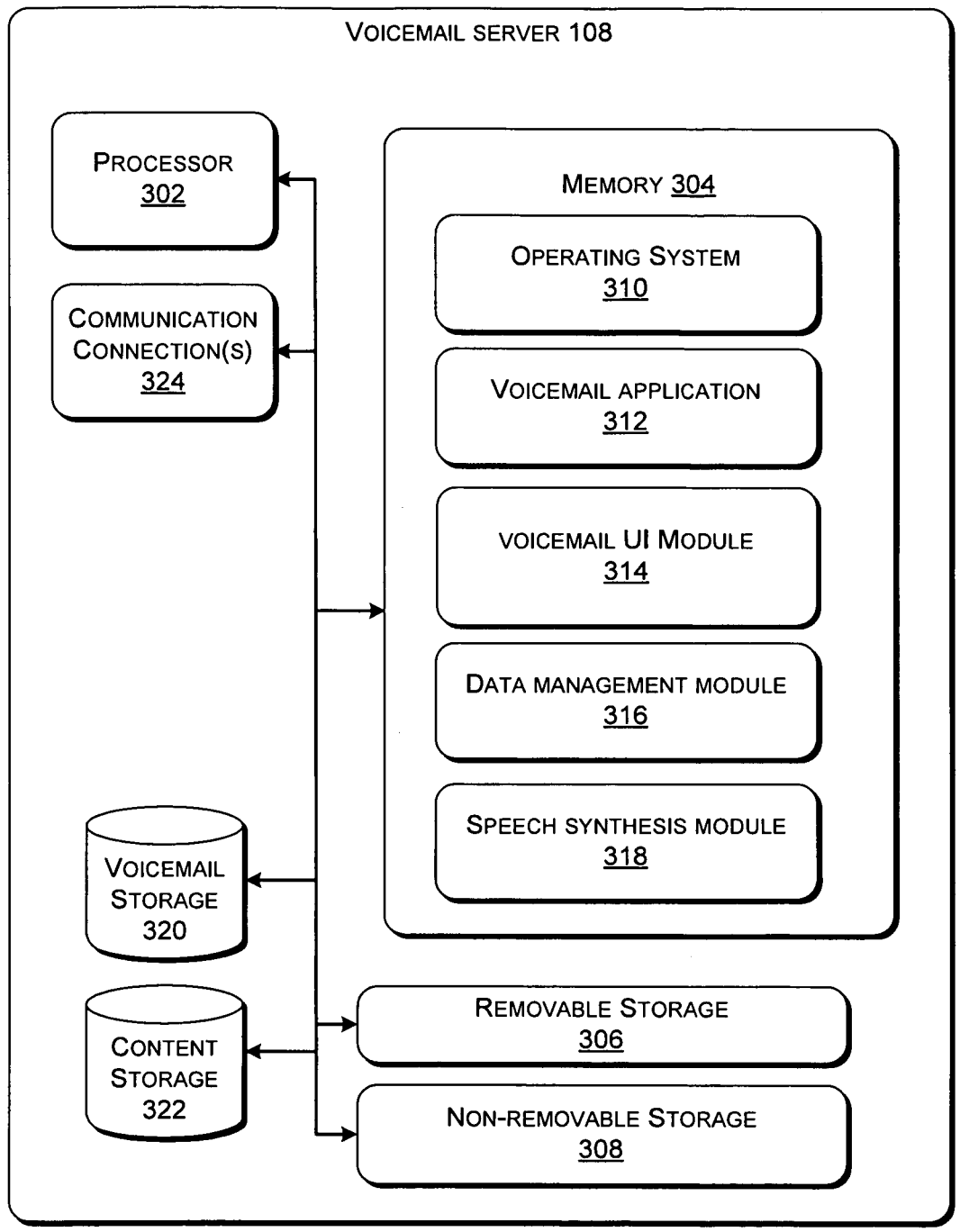
FIG. 3 is a block diagram showing an exemplary voicemail server usable with the architecture of FIG. 1.

FIG. 3 is a schematic block diagram showing details of the exemplary voicemail server 108. The voicemail server 108 may be configured as any suitable system capable of receiving, storing, routing, serving, and otherwise managing a voicemail service. In one exemplary configuration, the voicemail server 108 comprises at least one processor 302 and a memory 304. The voicemail server 108 may also include additional removable storage 306 and/or non-removable storage 308.

Turning to the contents of the memory 304 in more detail, the memory 304 may store an operating system 310 and one or more applications for implementing all or a part of the voicemail service. In the illustrated implementation, the memory 304 includes a voicemail application 312 and a voicemail interface module 314. The voicemail application 312 and voicemail UI module 314 may be stored on the voicemail server 108 in addition to or instead of the individual telecommunications devices 102 and 104. The memory 304 in this implementation also includes a data management module 316 and a speech synthesis module 318.

The data management module 316 stores and manages data, such as voicemail messages in voicemail storage 320, and content stored in content storage 322. The data management module 316 may also communicate with one or more local and/or remote databases, such as voicemail storage 212 and content storage 214 on telecommunications devices 102 and 104, and/or other network storage (not shown).

The speech synthesis module 318 interacts with the UI module 314 and the data management module 316 to perform voicemail with attachment functions. A text-to-speech (TTS) system converts normal language text into speech using one or more known techniques. The speech synthesis module 318 creates audible speech from pieces of recorded speech stored in a database. In particular, the speech synthesis module 318 may in some instances present the content in the attachment in an audible manner. The speech synthesize module 318 may also include voice recognition functionality to convert voicemail messages to text using one or more known techniques.

The server 108 may also contain communications connection(s) 324 that allow the processor 302 to communicate with the telecommunications devices 102 and 104, other network voicemail servers, network storage, and/or other devices on the network 106.

The server 108 may also include one or more known input device(s), such as a keyboard, mouse, pen, voice input device, touch input device, etc., and output device(s), such as a display, speakers, printer, etc. All these devices are well known in the art and are not discussed at length here.

Any memory described herein may include volatile memory (such as RAM), nonvolatile memory, removable memory, and/or non-removable memory, implemented in any method or technology for storage of information, such as computer-readable instructions, data structures, applications, program modules, voicemails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

Exemplary Originating Device Interface

Figure 4:
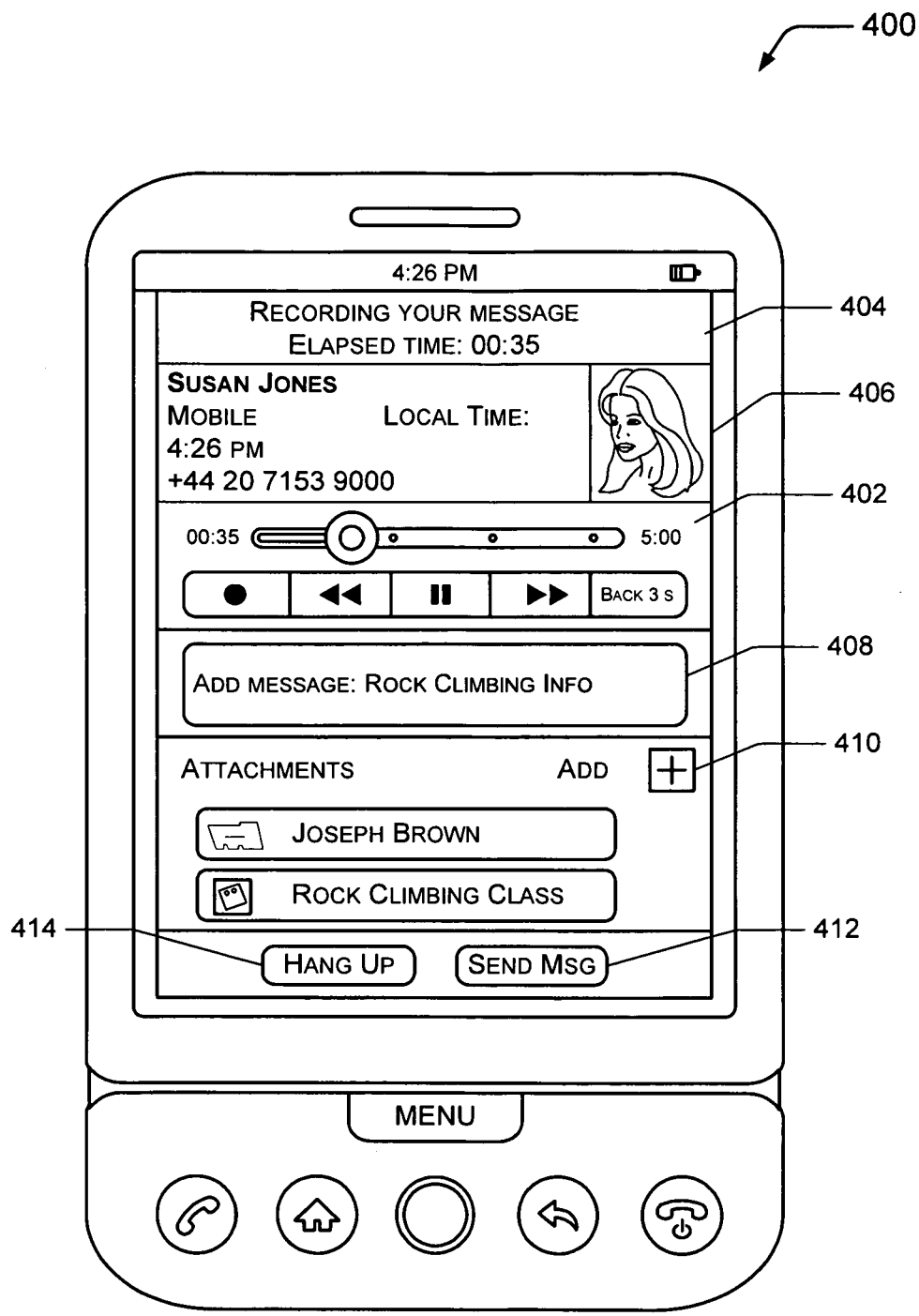
FIG. 4 is a schematic showing an exemplary sender user interface for recording a voicemail and for attaching content to the voicemail.
Figure 5:
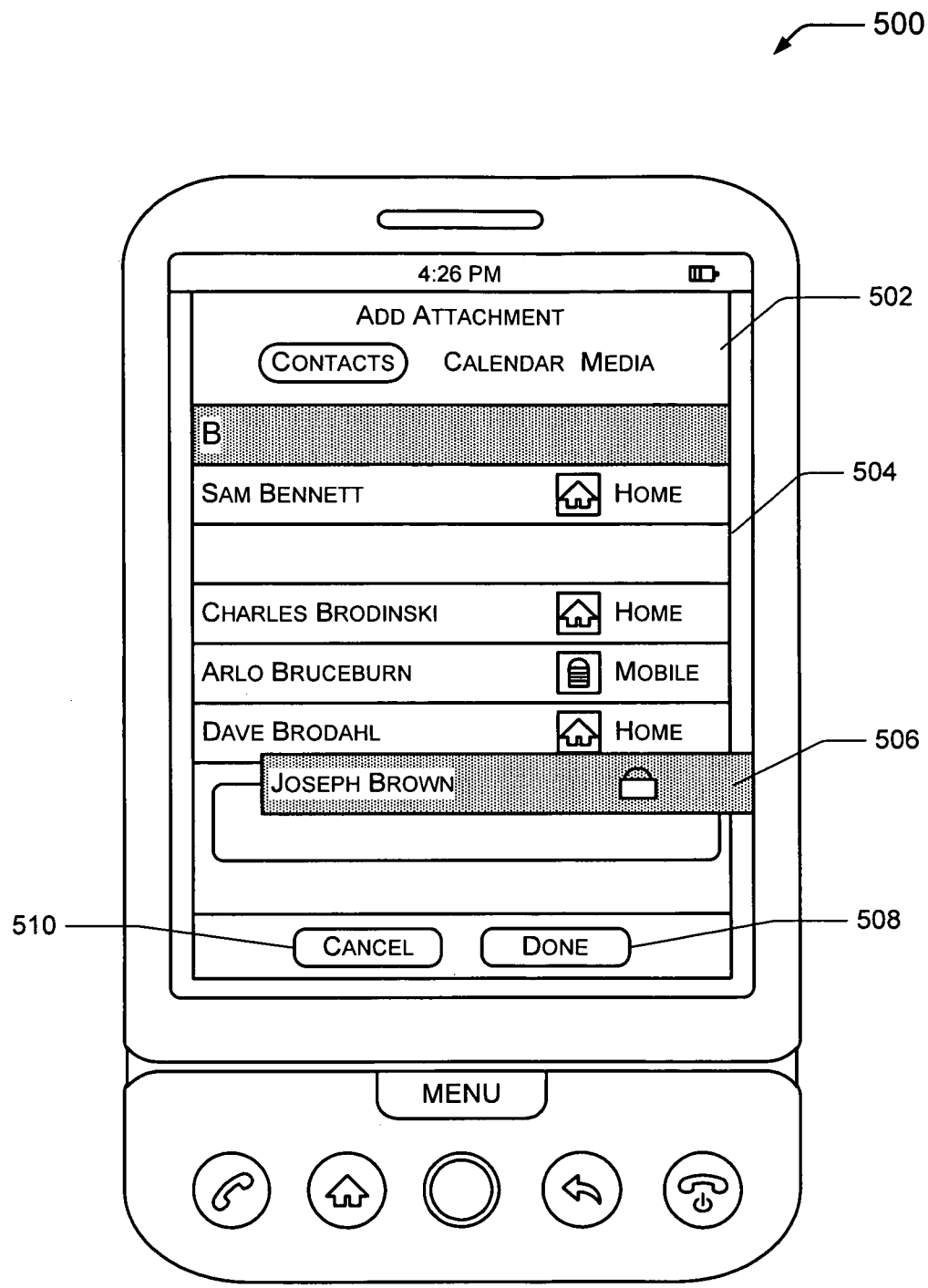
FIG. 5 is a schematic showing an exemplary content selection interface for identifying content (in this example contact information) to attach to a voicemail.
Figure 6:
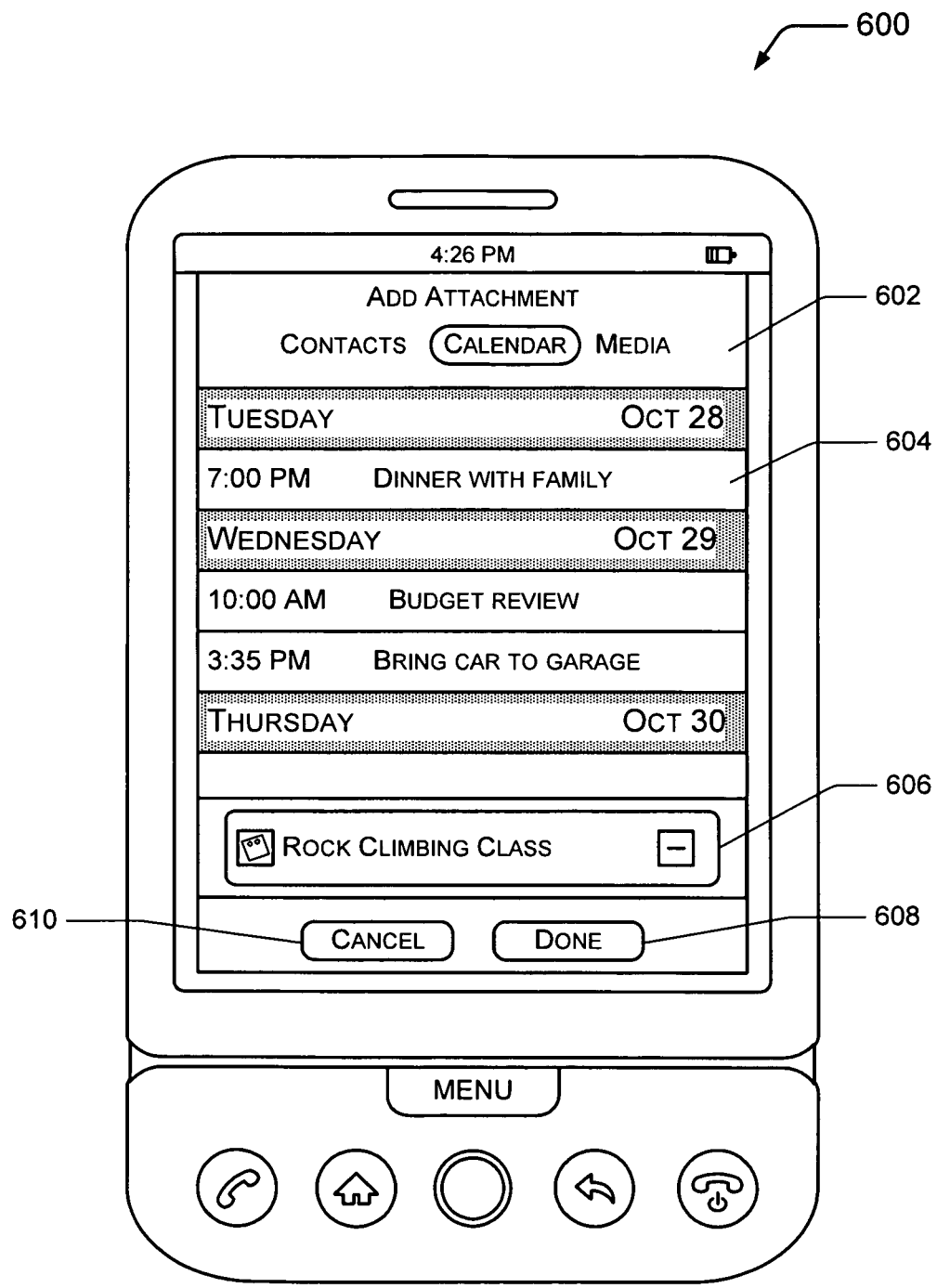
FIG. 6 is a schematic showing an exemplary content selection interface for identifying content (in this example calendar events) to attach to a voicemail.

FIGS. 4-6 illustrate exemplary user interfaces that may be presented on telecommunications device 102 of the caller 110 (the originating device). Some telecommunications devices have large touch-screen interfaces, alpha-numeric keypads, and other forms of input and display. The user interfaces described below are illustrative of user interfaces usable with a touch-screen interface. However, other user interfaces may be used if other types of telecommunications devices are used.

FIG. 4 shows an exemplary user interface 400 usable by a caller 110 to record a voicemail message (or by a recipient 112 to record a voicemail greeting) and to attach content to the voicemail message (or to the voicemail greeting). In this example, the user interface 400 includes a visual voicemail bar 402 that a caller 110 can use to record and edit a voicemail message. The visual voicemail bar 402 includes controls to record, play, pause, fast forward, rewind, and skip back a predetermined time (3 seconds in this example). The visual voicemail bar 402 also includes a progress bar illustrating a length of the recording in relation to a total available recording length.

The user interface 400 also includes a title bar 404 to illustrate the current activity and the time utilized for the activity 404. In the illustrated example, the title bar 404 indicates that the originating device 102 is "Recording Your Message," and that this activity has been in progress for an "Elapsed Time" of 35 seconds of recording.

The user interface 400 can also include an identification bar 406, including a name and a representation of the recipient 112, such as a photograph of the recipient 112, as well as a local time and a telephone number of the recipient 112.

The user interface 400 also includes an "Add Message" field 408, by which the caller 110 can enter a greeting, a title, a description, or other text message to attach to the voicemail. Selection of the Add Message field 408 may cause a touch screen keypad (not shown) to be overlaid over a portion of the user interface, so that the caller 110 can type in a desired text message. For example, the caller 110 could identify a subject of the voicemail, thereby providing the recipient 112 of the voicemail with an idea of what the voicemail is about. In the illustrated example, the caller 110 has entered the title "Rock Climbing Info" in the Add Message field 408.

The user interface 400 also includes an "Add Attachments" control 410, by which the caller 110 can signify that content is to be attached to the voicemail. The content may include content stored in memory of the originating device 102 and/or content stored on a network server, content available on the Internet, and/or content stored on any other storage devices accessible by the recipient device 104.

When the caller 110 is satisfied with the voicemail and any attachments, the caller may select a "Send Msg" control 412. Selection of the Send Msg control attaches the content to the voicemail and sends the voicemail to the recipient device 104 via the network(s) 106. As described in more detail below, the voicemail message may be recorded locally on the originating device 102 and transmitted to the recipient upon selection of the "Send Msg" control 412. Alternatively, the voicemail message may be recorded on a voicemail server, such as voicemail server 108, and user selection of the "Send Msg" control 412 may merely confirm that the message recording is complete. At any time the caller may select a "hang up" control 414 to end the communication and cancel the voicemail communication.

In some implementations, selection of the Add Attachments control 410 may cause one or more content selection interfaces 500 and 600 (shown in FIGS. 5 and 6, respectively) to be displayed on the display of the originating device 102.

FIG. 5 is a schematic showing an exemplary content selection interface 500 that may be displayed in response to user selection of the Add Attachment control 410 in FIG. 4. The content selection interface 500 allows the caller 110 to specify content to attach to the voicemail. The content selection interface 500 shows several categories from which the caller 110 may select content to attach to the voicemail are shown in a title bar 502. In the illustrated example, the categories in the tile bar 502 include Contacts, Calendar, and Media options, with the Contacts category being selected in FIG. 5. The content selection interface 500 for the Contacts category includes a list of contacts 504 stored in memory of the sending telecommunications device 102. In this example, the caller 110 indentifies "Joseph Brown" 506 as the contact information to attach to the voicemail. When the caller 110 is satisfied with the selection of content, he or she may select a "Done" control 508 to designate the contact information of Joseph Brown as content to attach to the voicemail. Selection of the Done control 508 will add a representation of the selected content (name, icon, etc.) to the list of Attachments on the user interface 400 in FIG. 4. Selection of a "Cancel" control 510 cancels selection of the content and returns the caller 110 to the user interface 400.

FIG. 6 is a schematic showing another exemplary content selection interface 600 for selecting a calendar event to attach to the voicemail. As illustrated, the Calendar category is highlighted in the title bar 602 of the content selection interface 600. Calendar entries are shown listed by date and time, along with a short description of the event 604. In the illustrated example, the caller 110 selects the event, "Rock Climbing Class" 606 to be attached to the voicemail. An icon on the left side of the feature bar indicates that the content is an event. A minus sign (−) on the right side of the feature bar may be used to deselect the event 606.

When the caller 110 is satisfied with the selection of content, he or she may select a "Done" control 608 to designate the event "Rock Climbing Class" as content to attach to the voicemail. Selection of the Done control 608 will add a representation of the selected content (name, icon, etc.) to the list of Attachments on the user interface 400 in FIG. 4. Selection of a "Cancel" control 610 cancels selection of the content and returns the caller 110 to the user interface 400.

Figure 7:
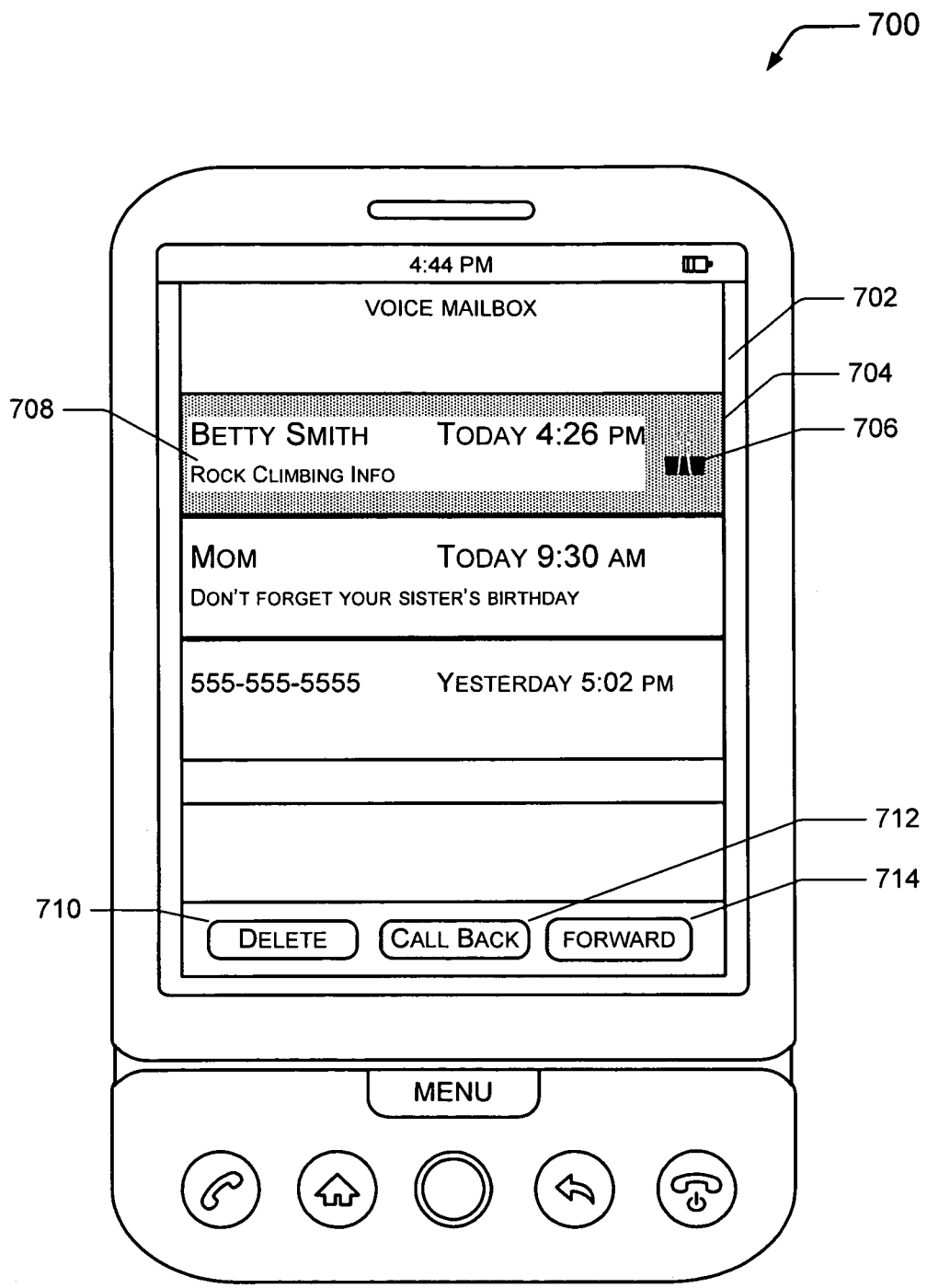
FIG. 7 is a schematic showing an exemplary recipient user interface for displaying a voice mailbox including a voicemail with attachments.
Figure 8:
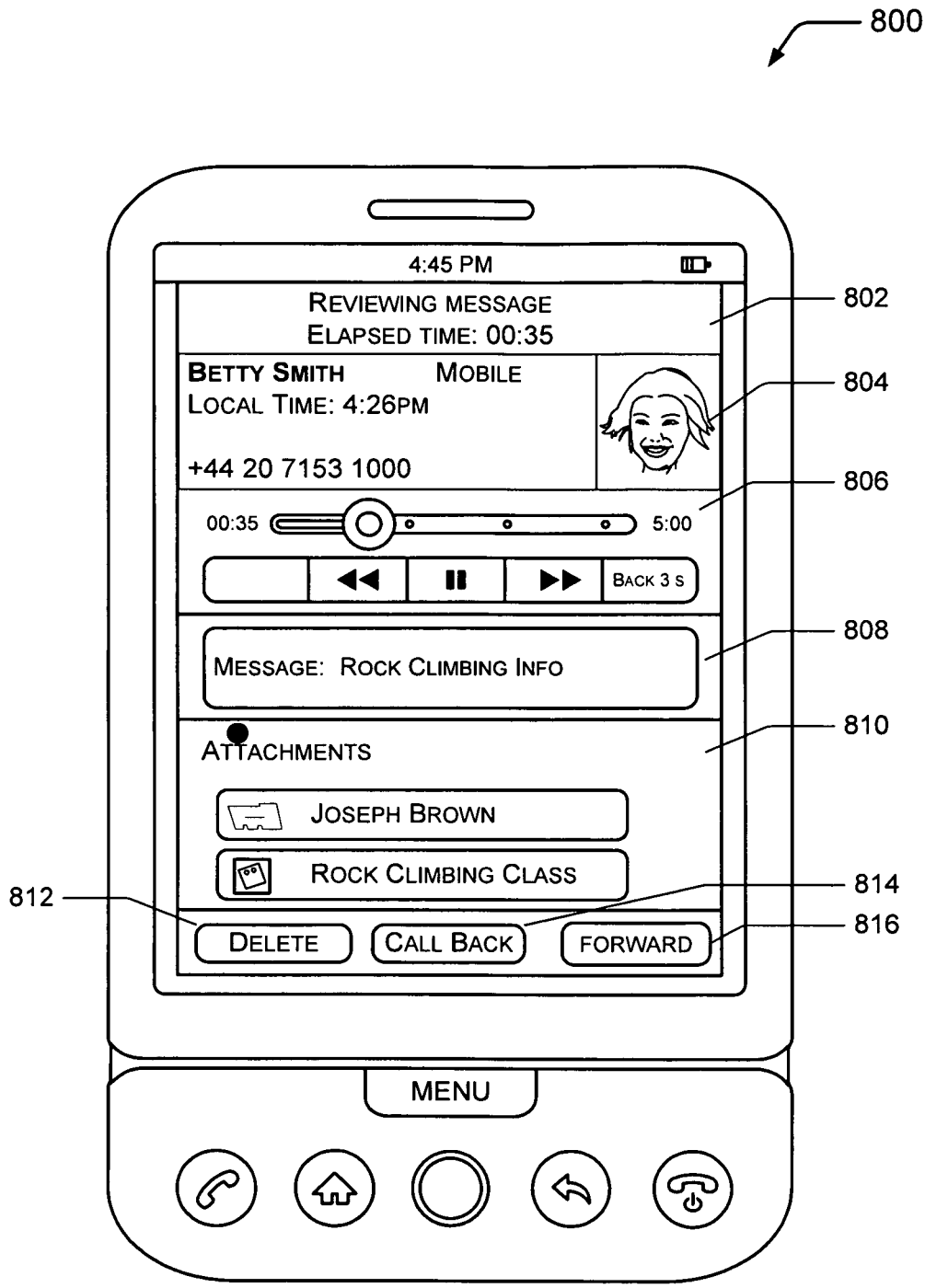
FIG. 8 is a schematic showing an exemplary recipient user interface for reviewing a voicemail with attachments.

The examples described above for the categories from which to select content to attach (e.g., contacts, calendar events, and media) are not exhaustive, and any other types of content described herein may be attached to the voicemail.
Exemplary Recipient Device User Interface FIGS. 7 and 8 illustrate exemplary user interfaces that may be used to present voicemail with attachments on the recipient device 104. FIG. 7 is an exemplary recipient user interface 700 for displaying a voice mailbox of a recipient 112 on the recipient device 104. The user interface 700 includes a title bar 702 describing the user interface 700 as the recipient's "Voice Mailbox". The user interface 700 also includes a list of voicemails 704 including a name of the caller, telephone number of the caller, and/or a time the voicemail was received. The user interface 700 also may include an attachment indicator 706 to designate whether each voicemail includes an attachment, and/or a message field 708 including any title or textual description accompanying the voicemail. Delete control 710 and Call Back control 712, are provided to allow the recipient 112 to respectively delete a voicemail or call back the caller. A Forward control 714 allows the recipient 112 to forward the voicemail to an individual or to multiple recipients. In some implementations, a message may be added to the forwarded voicemail by the forwarding party, while in other implementations, the voicemail may be forwarded without adding a message.

In the illustrated example, the voice mailbox includes three voicemail messages. In this example, the first voicemail message from Susan Jones is highlighted indicating that it has been selected by the recipient 112 for review. Selection of the first voicemail message causes presentation of a voicemail review interface 800 (shown in FIG. 8).

FIG. 8 illustrates an exemplary voicemail review interface 800 usable by a recipient 112 to review a voicemail message. In this example, the voicemail review interface 800 is shown displaying details of a voicemail from Betty Smith. The voicemail review interface 800 includes a title bar 802 indicating that the recipient 112 is "Reviewing Message," and has been reviewing the message for 35 seconds. The voicemail review interface 800 further includes caller identification information 804, including a picture of the caller, a name of the caller, a time the voicemail was received, and/or a telephone number of the caller, and playback controls 806 analogous to those of FIG. 4.

If a message was entered in the Add Message field 408 in FIG. 4, the message is displayed in a message field 808 of the voicemail review interface 800. Likewise, if any attachments were added to the voicemail using the Add Attachment control 410 in FIG. 4, representations of those attachments are displayed in an attachment field 810. In the illustrated example, the voicemail review interface displays a message "Rock Climbing Info" in message field 808 and displays representations of two items of attached content: contact information for Joseph Brown (a rock climbing instructor), and a calendar event for a rock climbing class. Additionally or alternatively, the representations of the attached content may be presented to the recipient by audio through a speaker device, e.g., announcing "Rock Climbing Class" with the time and date.

The recipient 112 may request that the attached content be presented by selecting the representations of the content. If the content exists on the recipient device (e.g., was transmitted with the voicemail), selection of the corresponding representation may result in the content being opened using an application corresponding to the type of content (e.g., a calendar application may be used to open a calendar event, a picture viewer may be used to open a photograph, etc.). If the content does not exist on the recipient device 104, the recipient device first locates and accesses the content before opening the content. The recipient 112 may then be presented with an option to download the content to the recipient device 104. In the case of a calendar event, selection of the representation of the attachment may result in the calendar event being added to the recipient's calendar, while selection of a representation of contact information may result in the contact information being added to an address book of the recipient 112.

Delete control 812, Call Back control 814, and Forward control 816 are also provided on the voicemail review interface 800 to allow the recipient 112 to respectively delete the voicemail, call back the caller, or forward the voicemail (with or without adding an additional message). The functionality of these controls is the same as for those in FIG. 7.

Exemplary Attachment Techniques

As discussed above, content may be attached to a voicemail in a variety of ways. FIGS. 9A-9D are schematic diagrams showing four illustrative ways in which content may be attached to a voicemail. However, other known techniques for attaching content to communications may additionally or alternatively be used.

Figure 9A:
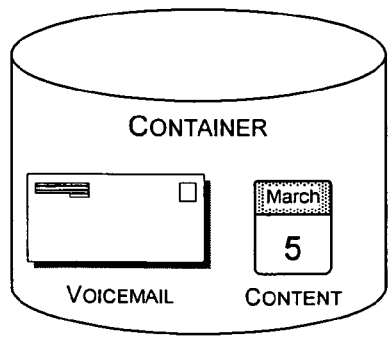
FIGS. 9A-9D are schematics showing illustrative techniques for attaching content to a voicemail.

FIG. 9A illustrates a first illustrative technique for attaching content to a voicemail by storing the content and the voicemail in a common container or envelope at the originating device 102. The container provides a way to contain, store, and transport computer files, such as the voicemail message and content described herein. The container may then be transmitted to the recipient device 104 via network(s) 106. Illustrative containers may include, but are not limited to, ZIP file format containers, Java Archive (JAR) file format containers, Multipurpose Internet Mail Extension (MIME) format containers transmitted via simple mail transport protocol (SMTP), and the like. Any suitable known data container may be used to hold the voicemail and the attachment(s).

Figure 9B:
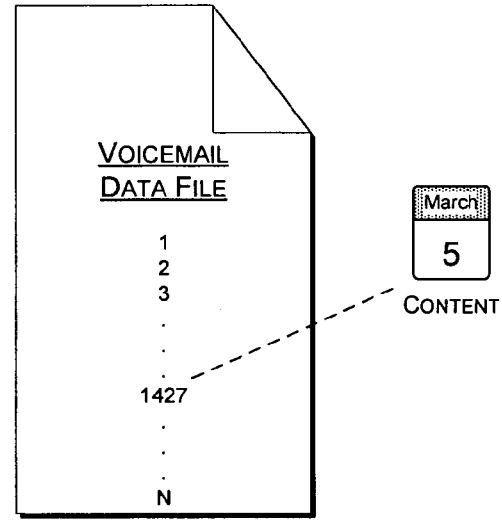

FIG. 9B illustrates a second illustrative technique for attaching content to a voicemail, in which the content is embedded at a location within the voicemail. In this example, the whole content (or a pointer to the content) is inserted in the voicemail data file at a specified location such that the content is presented to the recipient 112 during playback when the voicemail reaches the specified location. In one example, the location at which to embed the content may be specified by a byte offset of the location in the voicemail data file. The voicemail may then be transmitted to the recipient device 104 along with the embedded content (or an embedded pointer to the content). One way in which this technique might be used is to present content substantially contemporaneously with a verbal description of the content in the voicemail. For example, a voicemail message may include a map embedded at a point in the voicemail recording at which directions are verbally being described, such that the map will be displayed to a recipient at the same time the directions are being played back.

Figure 9C:
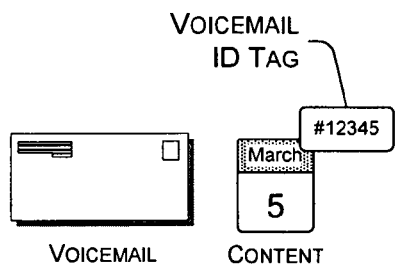

FIG. 9C illustrates a third illustrative technique for attaching content to a voicemail, in which the content is tagged with an identifier identifying the voicemail. In this example, the voicemail and the content may be transmitted and the content may be associated with the voicemail at the recipient device 104, the voicemail server 108, or another network server. The identifier may denote a device from which the voicemail is originating, a device for which the voicemail is intended, a time at which the voicemail was recorded, an account number of the originating and/or recipient devices, a unique message identifier, a combination of one or more of the foregoing, or some other identifier of the voicemail message.

Figure 9D:
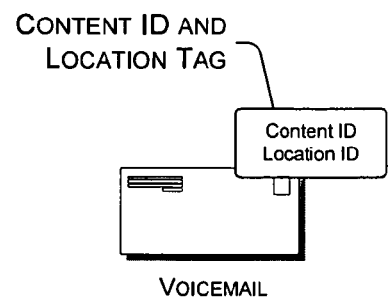

FIG. 9D illustrates a fourth illustrative technique for attaching content to a voicemail, in which the voicemail is tagged with a tag identifying the content and a location of the content on a network. In this example, the content need not be transmitted to the recipient device 104 at all. Rather, the voicemail may be transmitted to the recipient device 104 along with the tag, and the recipient device 104, voicemail server 108, or other network server may locate and access the content from a location accessible to the recipient device 104, based on a tag accompanying the voicemail. The recipient device 104 may also download and store the attachment in local memory of the recipient device 104. The tag may include a link, such as a hyperlink, to a location of the content on a network, such as a uniform resource locator (URL) or other uniform resource indicator (URI).

Thus, depending on the attachment technique employed, voicemails may be transmitted together with the attachment, or may be transmitted separately from the attachment and associated with the attachment at the recipient device, the voicemail server, or another network device. In some implementations, some or all of the content of an attachment may not be transmitted at all, such as in a case where attached content resides on a network server or storage device accessible to the recipient device.

Exemplary Processes

Figure 10:
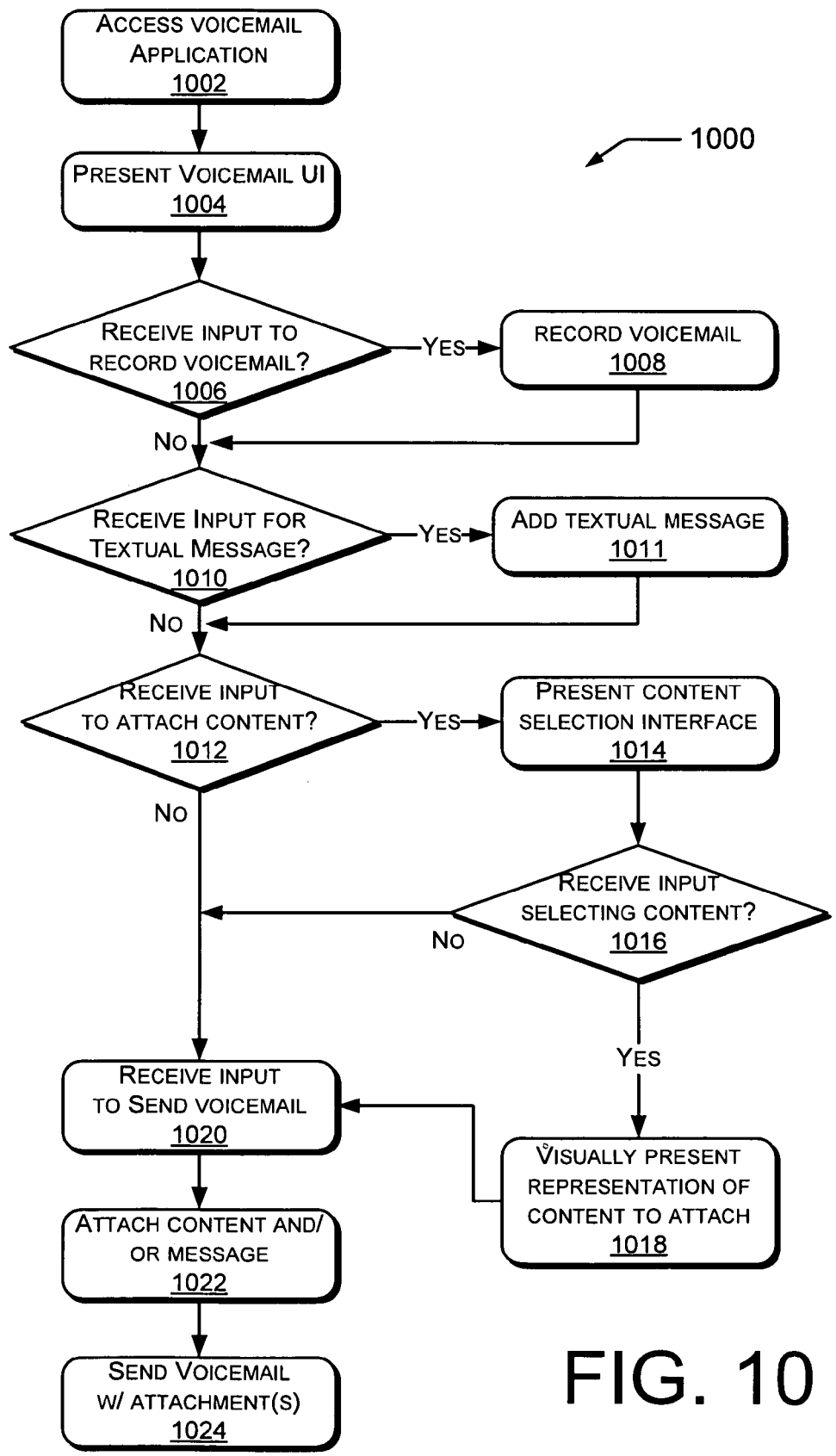
FIG. 10 is a flowchart showing an exemplary process of generating a voicemail with attachments at an originating telecommunications device.
Figure 11:
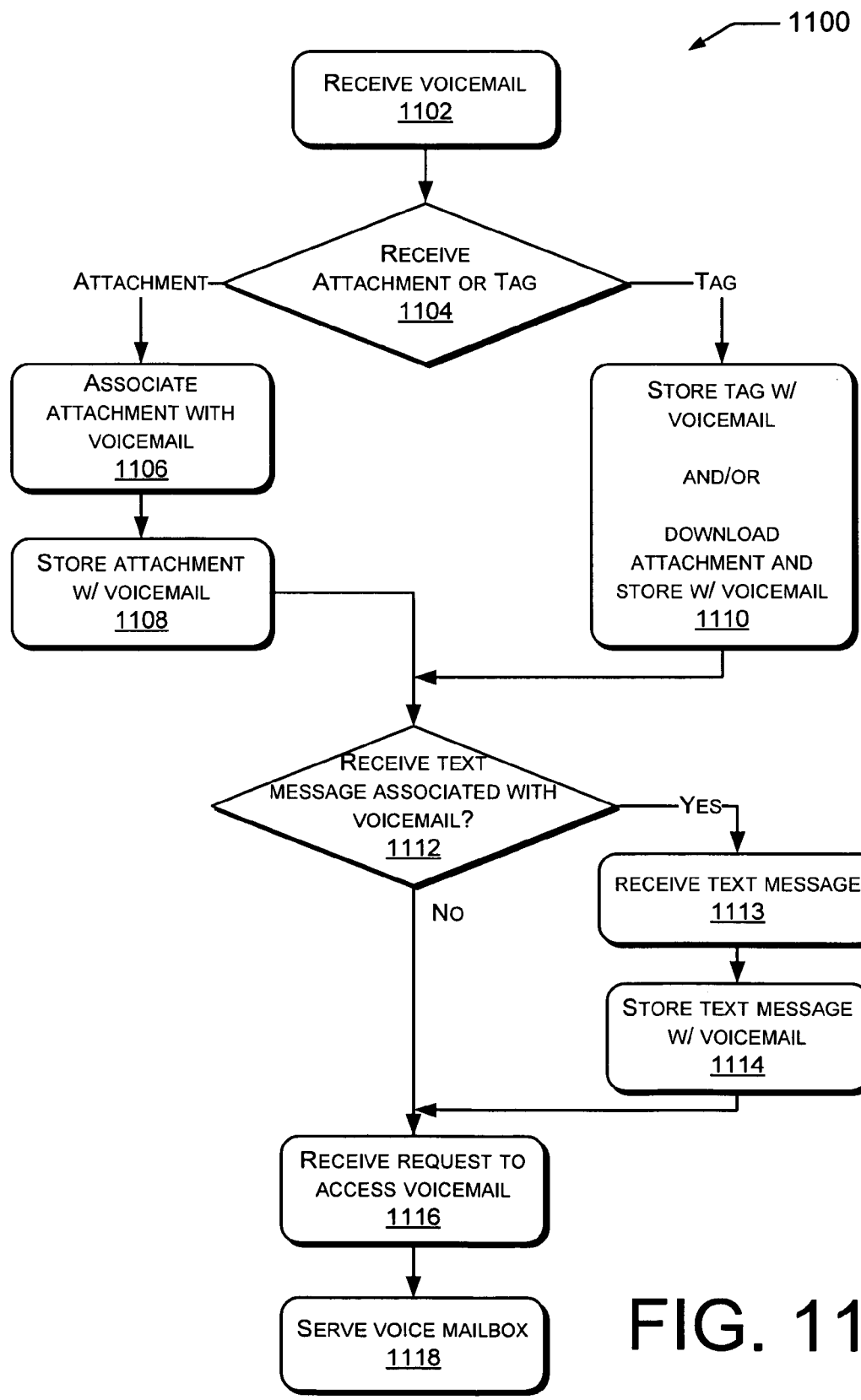
FIG. 11 is a flowchart showing an exemplary process of receiving and storing the voicemail with attachments at a voicemail server.
Figure 12:
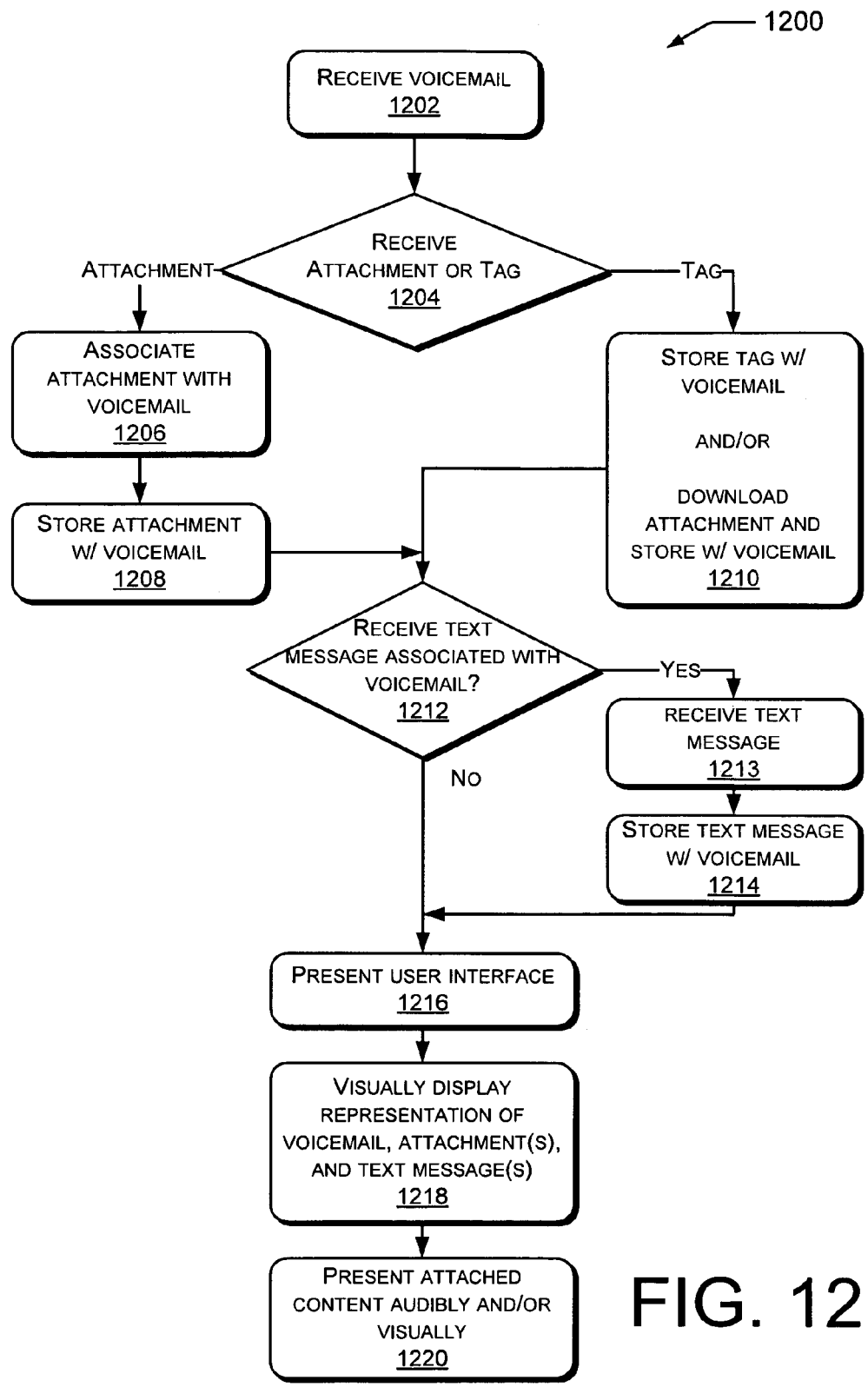
FIG. 12 is a flowchart showing an exemplary process of receiving, storing, and/or viewing the voicemail with attachments at a recipient telecommunications device.

FIGS. 10-12 are flowcharts showing exemplary processes for attaching content to voicemails, receiving voicemails with attachments, and presenting voicemails with attachments. The processes are illustrated as a collection of blocks in logical flowcharts, which represent a sequence of operations that can be implemented in hardware, software, or a combination. For discussion purposes, the processes are described with reference to the computing architecture 100 shown in FIG. 1, the telecommunications device 102 shown in FIG. 2, and the voicemail server 108 shown in FIG. 3. However, the processes may be performed using different architectures and devices. Moreover, the architectures and devices described herein may be used to perform different processes.

FIG. 10 is a flowchart illustrating an exemplary process 1000 of attaching content to a voicemail. Upon reaching a voice mailbox of a called party, the telecommunications device of the caller (the originating device 102), at block 1002, accesses a voicemail application 208 residing on the originating device 102 or voicemail application 312 on the voicemail server 108. At block 1004, the originating device 102 presents the caller 110 with a user interface 400 usable to record a voicemail message and to attach content to the voicemail. If, at block 1006, the originating device 102 receives input to record a voicemail, at block 1008, the originating device 102 records the voicemail locally or at the voicemail server 108 and proceeds to block 1010. If no input to record a voicemail is received at block 1006, the process proceeds directly to block 1010.

At block 1010, the originating device 102 presents the caller 110 with the user interface 400 usable to add a textual message. If at block 1010, the originating device 102 receives input to add a textual message, at block 1011, the originating device 102 receives a textual message via the Add Message field 408, such as a title or description of the voicemail. If no input to provide a textual message is received at block 1010, the process proceeds directly to block 1012.

If, at block 1012, the originating device 102 receives input indicating that content is to be attached to the voicemail, at block 1014, the originating device 102 may present a content selection interface 500 or 600 useable to select content to attach to the voicemail. If, at block 1016, the originating device 102 receives input selecting content to attach to the voicemail, at 1018, the originating device 102 visually presents a representation of the selected content on the user interface 400 before attaching the content to the voicemail. This visual representation allows the caller 110 to review and confirm that the selected content is the content that should be attached to the voicemail. If no selected content is received at block 1016, the process proceeds to block 1020. Likewise, if, at block 1012, the originating device does not receive an indication that content is to be attached, the process proceeds to block 1020.

If, after this visual presentation of the representation of the attachment(s) the caller is satisfied with the voicemail, any message, and any attachments, the caller 110 may select the Send Msg control 412. At block 1020, the originating device 102 receives the caller's selection of the Send Msg control 412, which instructs the originating device 102 to attach the message and content to the voicemail and send the voicemail to the recipient device 104 via the network(s) 106. At block 1022, the originating device 102 attaches the content to the voicemail using, for example, one of the four attachment techniques shown in FIGS. 9A-9D.

At block 1024, the originating device 102 transmits the voicemail with attachments to the recipient device 104 via the network(s) 106. As discussed above, depending on the attachment technique employed, voicemails may be transmitted together with the attachment, or may be transmitted separately from the attachment and associated with the attachment at the recipient device, the voicemail server, or another network device. In some implementations, some or all of the content of an attachment may not be transmitted at all, such as in a case where attached content resides on a network server or storage device accessible to the recipient device.

The process 1000 and user interface 400 may also be used to record an outgoing voicemail greeting with attachments and/or textual message(s). In that case, however, at block 1024, the voicemail with attachments is sent to the voicemail server 108 for storage and playback to callers as a voicemail greeting, along with presentation of any attached content and message(s). The attached content may include any of the types of content described herein.

By way of example and not limitation, the above techniques may be implemented to support sharing information among an individual or individuals on a contact list or as part of a group communication. In one example, companies may use voicemail with attachments to transmit advertisements to, or to communicate with, consumers who have given access to their voicemail mailboxes. In another example, attachments for promotional games, sweepstakes, and contests may be sent with voicemail messages to individuals who have signed up to receive this information. In yet another example, a voicemail with attachment could be sent to multiple recipients, as part of a group communication. For example, to support sharing information among individuals or employees, at universities, hospitals, corporations, offices, court systems, restaurants, sporting events, meetings, and the like.

FIG. 11 is a flowchart illustrating an exemplary process 1100 of managing voicemail at a voicemail server, such as voicemail server 108. At block 1102, the voicemail server 108 receives a voicemail from the originating device 102, the voicemail being associated with a recipient device. At block 1104, the voicemail server 108 receives an attachment associated with the voicemail or a tag identifying an attachment and a location of the attachment on a network accessible by the recipient device 104.

If, at block 1104, the voicemail server receives an attachment, at block 1106, the voicemail server 108 associates the attachment with the voicemail. The voicemail server 108 may associate an attachment with a voicemail because the attachment was received in a container with the voicemail, because the attachment was embedded within the voicemail, and/or because the attachment included an identifier of the voicemail. At block 1108, the voicemail server 108 stores the voicemail along with the attachment in a voice mailbox associated with the recipient device 104.

If, at block 1104, the voicemail server receives a tag, at block 1110, the voicemail server 108 stores the voicemail along with the tag in a voice mailbox associated with the recipient device 104. Additionally or alternatively, the voicemail server 108 may download the attachment based on the information in the tag and may store the attachment along with the voicemail.

If, at block 1112, the voicemail server 108 receives input to add a text message associated with the voicemail, such as a title or description of the voicemail, at block 1113, the voicemail server 108 receives input for the textual message and, at block 1114, stores the text message along with the voicemail and attachment or tag. If the voicemail server 108 does not receive input to add a textual message at block 1112, the process proceeds to block 1116.

At block 1116, the voicemail server 108 receives a request from the recipient device 104 to access the voice mailbox to retrieve voicemails. At block 1118, the voicemail server 108 serves to the recipient device 102 contents of the voice mailbox including the voicemail, and the attachment or tag.

FIG. 12 is a flowchart illustrating an exemplary process 1200 of receiving a voicemail with attachments at a telecommunications device, such as recipient device 104. At block 1202, the recipient device 104 receives a voicemail from an originating device 102 (directly or via voicemail server 108). At block 1204, the recipient device 104 may also receive an attachment associated with the voicemail or a tag identifying an attachment and a location of the attachment on a network accessible by the recipient device 104.

If, at block 1204, the recipient device 104 receives an attachment, at block 1206, the recipient device associates the attachment with the voicemail. The recipient device 104 may associate an attachment with a voicemail because the attachment was received in a container with the voicemail, because the attachment was embedded within the voicemail, and/or because the attachment included an identifier of the voicemail. At block 1208, the recipient device 104 stores the voicemail along with the attachment in memory of the recipient device 104.

If, at block 1204, the recipient device 104 receives a tag, at block 1210, the recipient device 104 stores the voicemail along with the tag in memory of the recipient device 104. Additionally or alternatively, the recipient device 104 may download the attachment based on the information in the tag and may store the attachment along with the voicemail.

If, at block 1212, the recipient device 104 receives a text message associated with the voicemail, such as a title or description of the voicemail, at block 1213, the recipient device 104 receives the textual message and, at block 1214, stores the textual message along with the voicemail and the attachment. If the recipient device 104 does not receive a text message at block 1212, the process proceeds to block 1216.

At block 1216, the voicemail application 208, 312 presents, on a display of the recipient device 104, a user interface 700 and 800 usable to access a voice mailbox associated with the recipient device 104. At block 1218, the voicemail application 208, 312 visually displays a representation of the voicemail 804 on the user interface 800 along with a representation of any attachment 810 associated with the voicemail and any text message 808 associated with the voicemail.

At block 1220, content of the attachment may be presented on the recipient device 104 by playing audibly and/or displaying visually the content.

In the case of attaching content to an outgoing voicemail greeting, a recipient telecommunications device 104 may have a user interface usable to access the voice mailbox and to present the voicemail greeting and the attached content. Content attached to the voicemail greeting may be visually displayed on the user interface of the recipient device 104. The attached content may include any of the content types described herein. The visual display may include an automatically displaying the content in response to the presenting the voicemail greeting. In another implementation, the visually displaying may include, displaying the content in response to receipt of user input to the user interface of the recipient device.

Additionally or alternatively, the voicemail with attachment may be sent directly to a voice mailbox of a recipient telecommunications device, without initially initiating a synchronous call to the recipient telecommunications device. In that case, the voicemail with attachment may be directly transmitted to the voice mailbox(es) of a single receipt or multiple receipts, without first initiating a call to the telecommunications device of the receipt(s). Additional details of how voicemail messages may be send directly to voicemail may be found in a co-pending application entitled "Direct Voicemailing," client docket number TM2-0005US, filed concurrently with this application.

Certain acts in processes 1000, 1100, and 1200 need not be performed in the order described, may be modified and/or may be omitted entirely, depending on the circumstances.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various embodiments. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more tangible computer-readable media stored with instructions that, when executed by a processor of a recipient device, perform acts comprising:
   receiving a voicemail greeting associated with a voice mailbox of a user of a called device;
   presenting, on a display of the recipient device, a user interface usable to access the voice mailbox;
   presenting the voicemail greeting on the recipient device; and
   visually displaying content attached to the voicemail greeting on the user interface.

2. The one or more tangible computer-readable media of claim 1, wherein the content attached to the voicemail greeting comprises an audible message.

3. The one or more tangible computer-readable media of claim 1, wherein the content attached to the voicemail greeting comprises a text message.

4. The one or more tangible computer-readable media of claim 1, wherein the visually displaying comprises automatically displaying the content in response to presenting the voicemail greeting.

5. The one or more tangible computer-readable media of claim 1, wherein the visually displaying comprises displaying the content in response to receipt of user input to the user interface of the recipient device.

6. A method comprising:
   receiving, by a recipient device, a voicemail greeting associated with a voice mailbox of a user of a called device;
   presenting, by the recipient device, on a display of the recipient device, a user interface usable to access the voice mailbox;
   presenting, by the recipient device, the voicemail greeting on the recipient device; and
   visually displaying, by the recipient device, content attached to the voicemail greeting on the user interface.

7. The method of claim 6, wherein the content attached to the voicemail greeting comprises an audible message.

8. The method of claim 6, wherein the content attached to the voicemail greeting comprises a text message.

9. The method of claim 6, wherein the visually displaying comprises automatically displaying the content in response to presenting the voicemail greeting.

10. The method of claim 6, wherein the visually displaying comprises displaying the content in response to receipt of user input to the user interface of the recipient device.

11. A recipient device comprising:
    a processor; and
    a plurality of computing instructions that, when executed by the processor, cause the recipient device to perform operations including:
      receiving a voicemail greeting associated with a voice mailbox of a user of a called device,
      presenting, on a display of the recipient device, a user interface usable to access the voice mailbox,
      presenting the voicemail greeting on the recipient device, and
      visually displaying, by the recipient device, content attached to the voicemail greeting on the user interface.

12. The recipient device of claim 11, wherein the content attached to the voicemail greeting comprises an audible message.

13. The recipient device of claim 11, wherein the content attached to the voicemail greeting comprises a text message.

14. The recipient device of claim 11, wherein the visually displaying comprises automatically displaying the content in response to presenting the voicemail greeting.

15. The recipient device of claim 11, wherein the visually displaying comprises displaying the content in response to receipt of user input to the user interface of the recipient device.

* * * * *